(12) United States Patent
Utaka et al.

(10) Patent No.: US 10,561,206 B2
(45) Date of Patent: Feb. 18, 2020

(54) FASTENING SYSTEM AND METHOD OF MANUFACTURING THEREOF

(71) Applicant: Utax U.S.A., Inc., Jersey City, NJ (US)

(72) Inventors: Daisuke Utaka, Nishiwaki (JP); Hideki Andoh, Nishiwaki (JP)

(73) Assignee: Utax U.S.A., Inc., Jersey City ( * ) Notice: Subject to any disclaimer, the term of this patent is extended or adjusted under 35 U.S.C. 154(b) by 0 days.

(21) Appl. No.: 15/989,700

(22) Filed: May 25, 2018

(65) Prior Publication Data
US 2019/0357636 A1 Nov. 28, 2019

(51) Int. Cl.
*A44B 13/00* (2006.01)
*A41F 1/00* (2006.01)
*F16B 45/00* (2006.01)
*F16B 1/00* (2006.01)

(52) U.S. Cl.
CPC .......... *A44B 13/0052* (2013.01); *A41F 1/002* (2013.01); *A41F 1/006* (2013.01); *A44B 13/0023* (2013.01); *F16B 1/00* (2013.01); *F16B 45/00* (2013.01); *F16B 2001/0035* (2013.01)

(58) Field of Classification Search
CPC . A44B 13/0052; A44B 13/0023; A41F 1/006; A41F 1/002; F16B 45/00; F16B 1/00; F16B 2001/0035
See application file for complete search history.

(56) References Cited

U.S. PATENT DOCUMENTS

| | | | | |
|---|---|---|---|---|
| 2,034,689 A * | 3/1936 | Alberts | .............. | A44B 13/0011 112/407 |
| 2,064,222 A * | 12/1936 | Roseman | ........... | A44B 13/0011 112/407 |
| 2,067,371 A * | 1/1937 | Allis | .................. | A44B 13/0011 112/407 |
| 2,312,775 A * | 3/1943 | Rabinowitz | ........ | A44B 13/0011 24/578.15 |
| 3,046,564 A * | 7/1962 | Roseman | ........... | A44B 13/0011 2/218 |
| 6,520,832 B2 * | 2/2003 | Devita | .................... | A41F 1/006 2/251 |
| 6,820,312 B1 * | 11/2004 | Senn | ........................ | A41F 1/006 2/321 |
| 7,618,305 B2 * | 11/2009 | Gut | ..................... | A44B 13/0052 24/697.1 |
| 7,638,009 B2 * | 12/2009 | Leung | ..................... | A41F 1/006 156/200 |
| 7,722,433 B2 * | 5/2010 | Utaka | ..................... | A44B 13/00 450/63 |
| 7,918,711 B2 * | 4/2011 | Yeung | ..................... | A41F 1/006 24/592.1 |
| 8,186,025 B2 * | 5/2012 | Fildan | .................... | A41F 1/006 24/591.1 |
| 8,359,718 B2 * | 1/2013 | Yeung | ..................... | A41F 1/006 24/591.1 |

* cited by examiner

*Primary Examiner* — Robert Sandy
*Assistant Examiner* — Louis A Mercado
(74) *Attorney, Agent, or Firm* — Nicholas P. Chiara; Holland & Knight LLP

(57) ABSTRACT

Disclosed is a fastening system for garments such as brassieres, and methods of manufacturing thereof, that places a female engaging device, such as an eye, in a cavity, thereby allowing a male engaging device, such as a hook, to engage with the female engaging device without adding bulk or depth to the fastening system. This provides a slim, comfortable and stylish fastener.

19 Claims, 3 Drawing Sheets

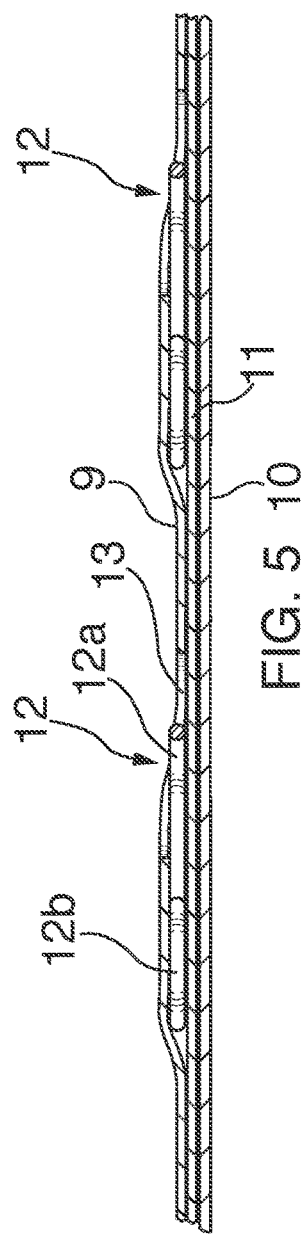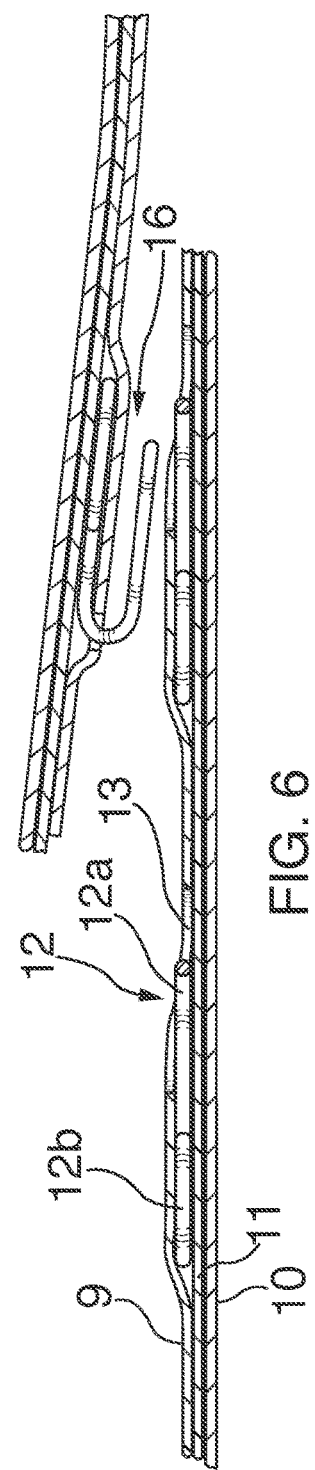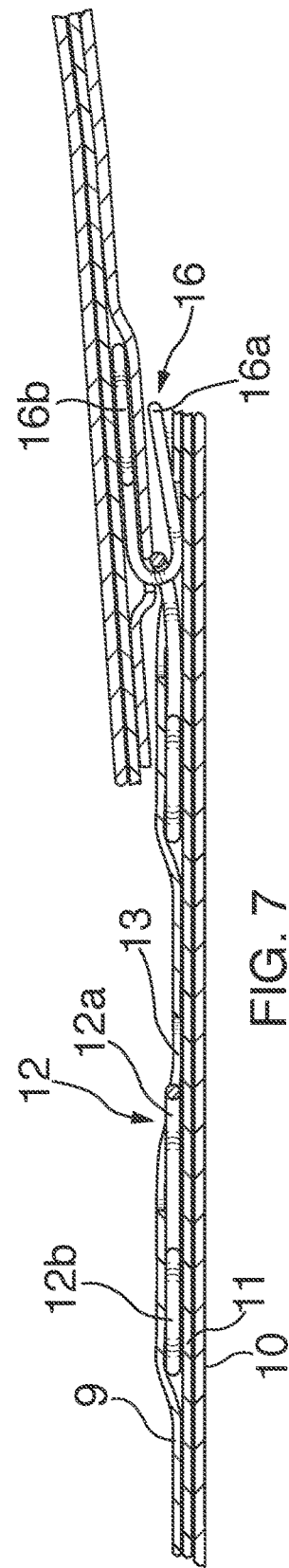

FASTENING SYSTEM AND METHOD OF MANUFACTURING THEREOF

FIELD OF THE ART

The present invention relates to a fastener for use with clothing and more particularly for under garments or bathing suits. The fastener are designed to be easily used and to be substantially flush when engaged. Examples of particular pieces of clothing that are suitable for use with the present invention are a brassiere, a bra-slip, a body suit, and a bathing suit.

BACKGROUND ART

Many types of fasteners for clothing are known in the field of garment manufacturing. A common type is the standard hook and eye combination that allows a user to engage a hook from one side of the garment into an eye on the opposite side of the garment. Examples of hook and eye combinations can be found in U.S. Pat. No. 8,186,025 ("Fildan et al."). Fildan et al describes ornamental arrangements of hook and eye combinations for brassiere back closure. Hook and eye fasteners are generally formed with a plurality of horizontally spaced vertical rows of eyes on an outer or back side of one half of the fastener and a complementary vertical row of hooks on a front or inner face of the other half of the fastener. The hooks engage in the eyes of one of the rows to fasten the two ends together. Generally the hook and eye fasteners are sewn or bonded to an elastic material, but the fastener components that contain the hooks and eyes are generally stiffer than material the fastener components are being attached to, such as a bra or other article of clothing.

The standard hook and eye fastener is effective, but has several drawbacks. The hooks are generally metallic and hard, and can dig into the wearer. The hooks can get caught on other articles of clothing while being laundered. Additionally, the known fasteners can often be bulky, allowing them to be seen underneath tight clothing. This creates an unattractive and unsightly bump or bulge.

Furthermore, longitudinal stress applied to the opposing ends of the garment containing the fasteners can cause the engaged fastener to curl, increasing the bump visible at the back of the wearer. Curling deformation increases with tension and makes the unattractive bump larger.

Moreover, manufacture of the hook and eye fasteners often involves several diverse steps that can lead to increases in cost, time and labor. Typically the fasteners are stitched together, either by machines or by hand, and it is difficult to provide stitching that perfectly matches the textile elements of the hook and eye fastener and the garment to which it is attached. This often leads to contrasts between the fastener and the rest of the article of clothing. Further, these contrasts can become exacerbated after continued use and washing.

One means for eliminating some of the above-described defects is a hook and eye tape in which the hooks and eyes are attached to a thin tape fabric materials, and the thin tape fabric materials are joined to the back cloth by thermal welding using a thermal adhesive film without sewing. This results in the sewing thread not appearing on the outer surface of the hook and eye tape, providing an improved appearance with less stiffness (see, for example, Japanese Utility Model Registration No. 3104261).

U.S. Pat. No. 7,722,433 ("Utaka") describes a slim, comfortable and fashionable fastening system for brassieres and other types of clothing. The system described in Utaka is simple and compatible with many type of clothing, but it requires thermofilm materials that can result in hard inflexible fasteners. Additionally, the system disclosed in Utaka does not provide a recessed cavity in which the eye component of the fastener is located, which provides additional slimness and flushness of the fastener of the present invention.

SUMMARY OF THE INVENTION

Existing methods for overcoming some of the drawbacks of fastener systems leave much to be desired. Primarily, the fastener systems are difficult and expensive to manufacture, and result in bulky components that produce unsightly and uncomfortable bulges.

For example, the hook and eye tape described above employs sewing to join an outer surface of one portion of the back cloth, producing a unfavorable appearance on its outer surface.

Additionally, the opposite sides of the hook/eye tape fastener overlap, and because of their concave and convex nature result in lack of comfort to the wearer.

The present invention overcomes the above-described drawbacks by providing a substantially flush fastener system that is comfortable, slim and less costly to manufacture. The fastener of the present invention provides a male engaging devices (such as a hook) and female engaging devices (such as an eyes) not on the outer surfaces of the fastener, but internally within the engaged fastener, thereby resulting in no concave and convex components. Both the male and female components of the fasteners are formed in a very thin and compact manner. Additionally, while the male engaging device is on the outer surfaces of the male fastener component, when the two components are engaged the overall system is substantially flush because the female fastening component rests in a cavity (or recess) formed in the front material and the male engaging device slips into the cavity (or recess) to lock into the female engaging device. This results in a stylish appearance that is both simple and neat, as well as comfortable for the wearer.

The present invention provides a fastener comprising a male engaging device and a female engaging device, wherein the male engaging device is embedded in a male fastener component and the female engaging device is embedded in a female fastener component, wherein the female fastener component comprises a back material, an internal material, and a front material, and wherein said female engaging device is attached to a surface of the internal material between the front material and the back material of the female fastener component, wherein the female engaging device comprises a base portion and a head portion, and wherein said head portion of the female engaging device is located in a recess created by an opening in the front material wherein said head portion of the female engaging device is exposed to an outside of the female fastener component, and wherein said female fastener component is substantially flush, wherein the male fastener component comprises a back material, an internal material, and a front material, and wherein said male engaging device is attached to a surface of the internal material between the front material and the back material of the male fastener component, wherein the male engaging device comprises a base portion and a head portion, and wherein said head portion of the male engaging device protrudes through an opening provided in the front material exposing said head portion of the male engaging device to an outside of the female fastener component, wherein the head portions of the male and female engaging devices are engageable with each other and become substantially flush when engaged.

An additional object of the invention is to provide a simple, cost effective and improved method of manufacturing fasteners for clothing. Prior methods of manufacturing fasteners often rely on multiple layers of fabric joined by stitching or thermosealing. These methods often result in inconsistent products that are stiff, hard and inflexible. The use of thermosealing in particular can lead to a sharp and/or hard edge on the fasteners. Thermo-sealing usually employs ultrasonic and welding techniques on the fabric itself. This results in the welded part of the fabric becoming hard, which is undesirable for the finished product. Further, stitching can be costly, inconsistent, and result in additional bulges or raised areas that are uncomfortable and/or unsightly. The present manufacturing method is easily scalable, consistent and produces a very slim and unobtrusive fastener for clothing that is both comfortable and stylish. The advantages of the present manufacturing system are related to the use of hot-melt bonding techniques that are optimally used with polyurethane hot melt without stitching or thermosealing.

The seamless hook and eye system disclosed in Utaka are constructed with fasteners that are attached to the internal material, wherein the fasteners are inserted into the openings of the front material one-by-one in a manual operation. In contrast, in the present invention the fasteners are attached to the internal material, however instead of needing to manually insert each fasteners into the openings of the front material, the front material is bonded to the internal material, wherein the fasteners are located within the recess created by the opening in the front material. This process increases work efficiently, reduces costs, and improves consistency in the final product.

BRIEF DESCRIPTION OF THE DRAWINGS

FIG. 5 a side view of the female fastener component.
FIG. 6 is a side view of male fastener component and the female fastener component prior to engagement.
FIG. 7 is a side view of male fastener component and the female fastener component engaged.

DETAILED DESCRIPTION OF THE INVENTION

Figure 1:
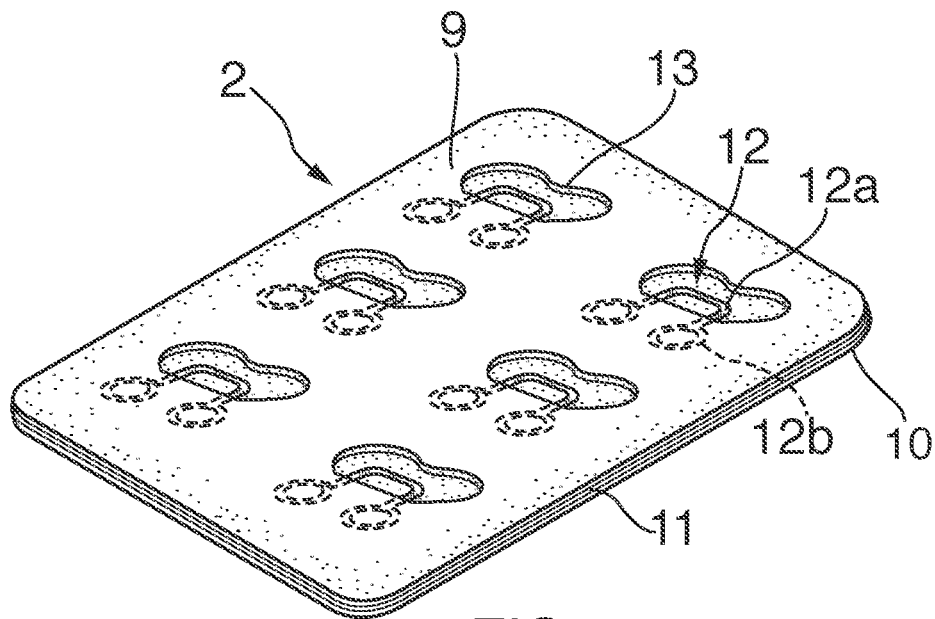
FIG. 1 is a front view of the female fastener component.

FIG. 1 depicts an embodiment of the female fastener component (2) of the present invention. FIG. 1 shows the female engaging device (12), which possess both a head portion (12a) and a base portion (12b), wherein the head portion (12a) is located in an opening (13) arranged at predetermined intervals on the front material (9). As shown in FIG. 1, between the front material (9) and the back material (10), there is provided an internal material (11) to which base portion (12b) of the female engaging device (12) are attached. Preferably, the back material (10), internal material (11) and front material (9) are combined by adhesive film or hot melt glue. The female engaging device (12) is attached to the internal material by sewing or insert molding. Next the front material (9) with openings (13) is applied over the internal material (11) creating cavities in which the head portion (12a) of the female engaging device is to be located and accessible by the male engaging device (16). The front material is sealed to the internal material by adhesive film, hot melt glue or PUR (Ploy Urethane Reactive hot melt).

Figure 2:
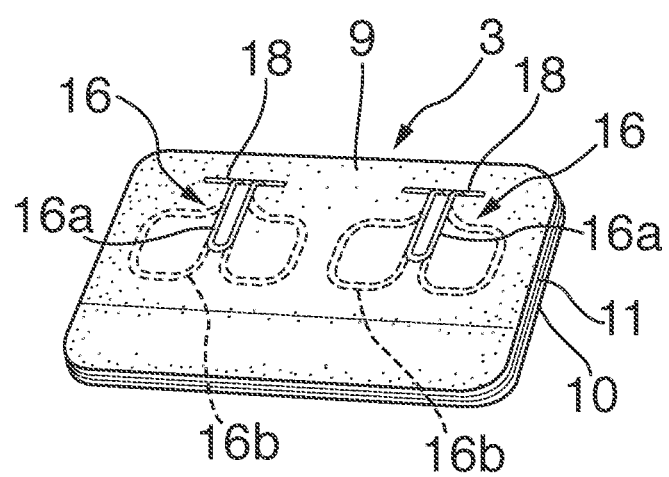
FIG. 2 is front view of the male fastener component.

FIG. 2 shows an embodiment of the male fastener (3) of the present invention. FIG. 2 shows the male engaging device (16), which contains both a base portion (16b) and a head portion (16a). As shown in FIG. 2, between the front material (9) and the back material (10), there is provided an internal material (11) to which base portion (16b) of the male engaging device (16) are attached. The male engaging device (16) are attached to an internal material (11) and protrude through longitudinal slits (18) provided in the front material (9). The male engaging device are attached to the internal material (11) by sewing or insert molding. Next, the front material (9) is applied to the internal material (11) and the back material (10) allowing the head portions (16a) of the male engaging device to protrude through the longitudinal slits (18) of the front material (9). The front and back materials are joined by adhesive film, hot melt glue or PUR (Ploy Urethane Reactive hot melt).

Figure 3:
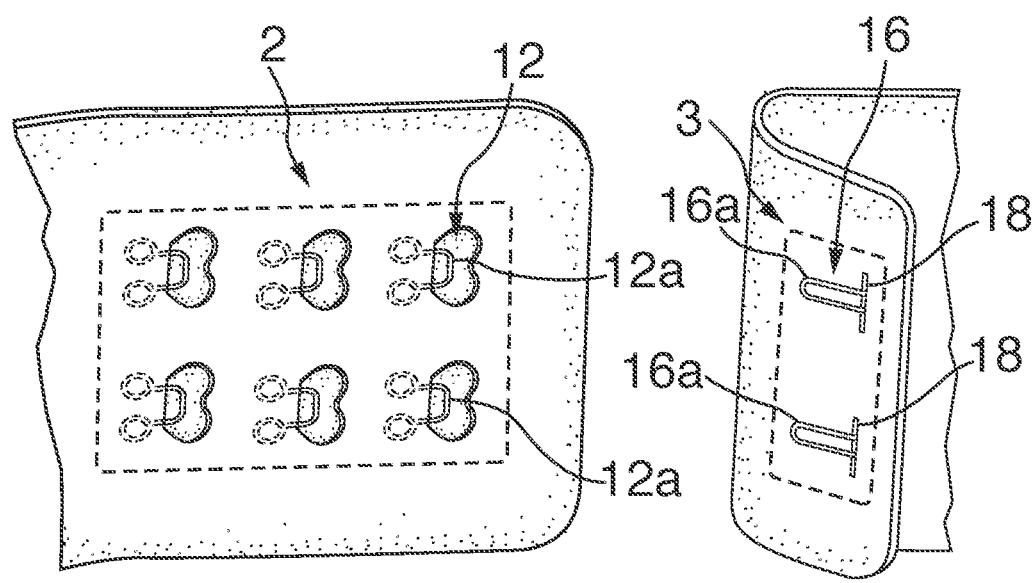
FIG. 3 is a front view of male fastener component and the female fastener component prior to engagement.

FIG. 3 shows an embodiment of female fastener component (2) and the male fastener component (3) attached to opposing wings of an article of clothing. The fasteners are both in the disengaged configuration.

Figure 4:
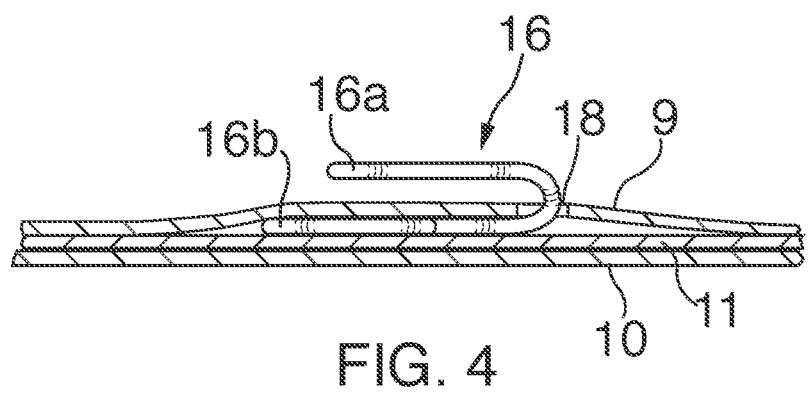
FIG. 4 a side view of the male fastener component.

FIG. 4 is a side view of the male fastener component (3), wherein the male engaging device (16) is protruding through the longitudinal slit (18) in the front material (9). The internal material (11) and back material (10) can be seen below the male engaging device.

FIG. 5 is a side view of the female fastener component (2), wherein the female engaging device (12) is located within a cavity formed by opening (13) in the front material (9). The back material (10) and internal material (11) can be seen below the female engaging device (12).

FIG. 6 is a side view of the male fastener component (3) and the female fastener component (2) prior to engagement.

FIG. 7 is a side view of male fastener component (3) and the female fastener component (2) engaged.

Between the front material (9) and the back material (10) the female engaging device (12) is attached to an internal material (11) sandwiched between the front material (9) and the back material (10). Heat and pressure are applied using a heat press machine to weld the front material (9) and the back material (10) and integrate the female engaging device (12), which is interposed between the materials and located within a cavity formed from the openings (13) in the front material (9). The front material (9) partially overlays the female engaging device and secures it to the female fastener component (2). The partial overlay created by the opening (13) creates the recess or cavity in which the head portion (12a) of the female engaging device (12) is located and made accessible to the male engaging device (16). This provides a neat and elegant, as well as substantially flush appearance.

The male fastener component (3) is prepared by a similar method as described above, but without cavities in the front material (9).

The front material (9) can be any type of materials such as warp/weft knit and/or woven fabric. Commercial examples of warp/weft knit and/or woven fabric are two way tricot fabric, interlock fabric, and/or broad woven fabric. Preferably the front material (9) is a fabric such as warp knit and/or weft knit. The front material (9) is very thin and can have a thickness from about 0.3 mm to 0.8 mm. Preferably the thickness is about 0.5 mm.

In one embodiment of the present invention a fastener is manufactured according to the following steps:

a) preparing a female fastener component by:
  i. attaching a female engaging device to an internal material by sewing and/or insert molding,
  ii. applying hot melt sheet or hot melt liquid to the front and back material or both side of an internal material, wherein said female engaging device comprises a base portion and head portion;
  iii. attaching a back material to an internal material on an opposite surface from said female engaging device attached; and
  iv. attaching a front material to said internal material, wherein said front material has an opening that partially overlays the female engaging device causing the head portion of said female engaging device to be located in a cavity created by the opening, allowing the head portion to be exposed to the outside of the female fastener component, and sealing the base portion of the female engaging device between the front material and the internal material;
  v. and wherein the female fastener component is substantially flush,
b) preparing a male fastener component by:
  i. attaching a male engaging device to an internal material, wherein the male engaging device comprises a base portion and head portion by sewing and/or insert molding,
  ii. applying a hot melt sheet or hot melt liquid to the front and back material or to both sides of the internal material,
  iii. attaching a back material to the internal material on an opposite surface from the male engaging device; and
  iv. attaching a front material to the internal material, wherein the front material has an opening or a slit allowing the head portion of said male engaging device to be exposed to the outside of the male fastener component, and sealing the base portion of the male engaging device between the internal material and the front material.

The present invention can also be described as a male means for engaging device and a female means for engaging device, as follows. A fastener comprising a male means for engaging device and a female means for engaging device, wherein the male means for engaging device is embedded in a male fastener component and said female means for engaging device is embedded in a female fastener component, wherein said female fastener component comprises a back material, an internal material, and a front material, and wherein said female means for engaging device is attached to a surface of the internal material between the internal material and the front material of the female fastener component, wherein the female means for engaging device comprises a base portion and a head portion, and wherein said head portion of the female means for engaging device is located in a recess created by an opening in the front material wherein said head portion of the female means for engaging device is exposed to an outside of the female fastener component, and wherein said female fastener component is substantially flush, wherein the male fastener component comprises a back material, an internal material, and a front material, and said male means for engaging device is attached between the internal material and the front material of the male fastener component, wherein the male means for engaging device comprises a base portion and a head portion, and wherein said head portion of the male means for engaging device protrudes through an opening or slit provided in the front material exposing said head portion of the male means for engaging device to an outside of the male fastener component, wherein the head portions of the male and female means for engaging devices are engageable with each other and become substantially flush when engaged.

The back material (10) can be any type of materials such as warp/weft knit and/or woven fabric. Preferably the back material (10) is a fabric such as warp knit and/or weft knit. The back material (10) is very thin and can have a thickness from about 0.3 mm to 0.8 mm. Preferably the thickness is about 0.5 mm.

The internal material (11) can be any type of materials such as warp/weft knit and/or non-woven fabric. Preferably the internal material (11) is a fabric such as non-stretchable warp knit, such as Queens cord. The internal material (11) is very thin and can have a thickness from about 0.1 mm to 0.8 mm. Preferably the thickness is about 0.3 mm.

The female engaging devices (12) and the male engaging devices (16) can be prepared from metal, plastic, ceramics, magnets, or reinforced fiber. The female engaging devices (12) and the male engaging devices (16) can be coated or uncoated, colored or uncolored. Preferably, the female engaging devices (12) and the male engaging devices (16) are composed of eyes (female) and hooks (male) that are made from metallic materials. Generally, the female engaging device (12) will be a loop or eye, and the male engaging device will be a hook. Other possible variations on the type, size, shape and structure of the engaging devices are known in the art and readily employable in the present invention provided that they are compatible with the recessed and flush engagement required by the present invention.

Methods of welding the front/internal/back materials include bonding and ultrasonic welding. Adhesives useful in welding these materials include hot melt sheet, hot melt liquid and polyurethane reactive.

Adhesives are applied to the front and back materials by hand, by a silk screen method, or by an ink jet method.

When using a hot melt sheet, the sheet is tacked to the front and back material by a heat press machine. The tacking condition are at a temperature of about 120° C. and at pressure of about 0.2 kg/cm$^2$ to about 0.5 kg/cm$^2$, for about 10 seconds.

Next, the internal material is welded between the front and back material.

Pressures and temperature ranges suitable for welding these materials include pressure: from about 0.2 kg/cm$^2$ to about 0.8 kg/cm$^2$, and temperature from about 40° C. to about 180° C.

The female and male fastener components can be attached/welded/sewn applied to articles of clothing by ultrasonic welder, heat/cold press machine, or sewing machine. Preferred methods are welded and sewn. The most preferred method is welded.

The thin stretchable material employed in the present invention allows for warp and weft in the lateral direction. This allows for the fastener to fit a wearer in an even and consistent manner, even when the wearer is exercising and shifting positions.

Multiple variations on embodiments described in the present application can be employed based on the need of the fastener and the specific use of the fastener for particular types and/or sizes of clothing. Variations include, but are not limited to multiple rows of female engaging devices, such as one row, two rows, three rows, or more rows. Additionally, while the present exemplified embodiments have two female engaging devices in each row, there could be one, two, three, four or more in each row. These same variations can be applied to the male engaging devices, however for ease of use and flushness of the engaged fastening component, the male engaging device should generally only be in a single row, and that row should contain an equivalent number of male engaging devices as found in its opposite female fastening component. Embodiments of the present invention include a plurality of both the female engaging devices and the male engaging devices.

Variations can also be made to the materials that comprise the fastening components. If necessary the internal material can be removed and/or more than one internal material can be employed.

When the front material (9) and the back material (10) are joined and integrated with each other portions are intentionally not welded/bound. This allows for increased air permeability, which increases stretchability.

Further, the opening created in the front material in which the head portion of the female engaging device is located can vary in size and shape relative to the head portion of the female engaging device. For example, the opening can be a square, a rectangle, a circle, a heart, an oval, or any other shape that allows for complete access of the male engaging device to access the female engaging device. The opening must be larger than area occupied by the head portion of the female engaging device.

The foregoing description and examples have been set forth merely to illustrate the present invention and are not intended to be limiting. Since modifications of the described embodiments incorporating the spirit and substance of the invention may occur to persons skilled in the art, the invention should be construed broadly to include all variations within the scope of this application, including but not limited to the appended claims and equivalents thereof.

The invention claimed is:

1. A fastener comprising a male engaging device and a female engaging device, wherein the male engaging device is embedded in a male fastener component and the female engaging device is embedded in a female fastener component,
    wherein the female fastener component comprises a back material, an internal material, and a front material, and wherein said female engaging device is attached to a surface of the internal material between the front material and the back material of the female fastener component,
    wherein the female engaging device comprises a base portion and a head portion, and wherein said head portion of the female engaging device is located in a cavity created by an opening in the front material, wherein said head portion of the female engaging device is exposed to an outside of the female fastener component, and wherein said female fastener component is substantially flush,
    wherein the male fastener component comprises a back material, an internal material, and a front material, and wherein said male engaging device is attached to a surface of the internal material between the front material and the back material of the male fastener component,
    wherein the male engaging device comprises a base portion and a head portion, and wherein said head portion of the male engaging device protrudes through an opening provided in the front material exposing said head portion of the male engaging device to an outside of the male fastener component,
    wherein the head portions of the male and female engaging devices are engageable with each other and become substantially flush when engaged.

2. The fastener according to claim 1, wherein said female engaging device is an eye and the male engaging device is a hook.

3. The fastener according to claim 2, wherein said female engaging device comprises a plurality of eyes and the male engaging device comprises a plurality of hooks.

4. The fastener according to claim 1, wherein said opening in the front material of said female engaging device is a circle or an oval.

5. The fastener according to claim 1, wherein said opening in the front material of said female engaging device is heart shaped.

6. The fastener according to claim 1, wherein said opening in the front material of said female engaging device is square or rectangular.

7. The fastener according to claim 1, wherein said male engaging device and said female engaging device are metal.

8. The fastener according to claim 1, wherein said male engaging device and said female engaging device are plastic.

9. The fastener according to claim 1, wherein said male engaging device and said female engaging device are ceramic.

10. The fastener according to claim 1, wherein said male engaging device and said female engaging device are magnetic.

11. The fastener according to claim 1, wherein said front material is woven fabric.

12. The fastener according to claim 1, wherein said front material is a non-woven fabric.

13. The fastener according to claim 1, wherein said back material is woven fabric.

14. The fastener according to claim 1, wherein said back material is a non-woven fabric.

15. The fastener according to claim 1, wherein said internal material is woven fabric.

16. The fastener according to claim 1, wherein said internal material is a non-woven fabric.

17. A method of manufacturing a fastener comprising the following steps:
    a) preparing a female fastener component as follows:
        i. attaching a female engaging device to an internal material,
        ii. wherein said female engaging device comprises a base portion and head portion
        iii. attaching a back material to an internal material on an opposite surface from said female engaging device; and
        iv. attaching a front material to said internal material, wherein said front material has an opening that partially overlays said female engaging device causing said head portion of said female engaging device to be located in a cavity created by the opening, allowing said head portion to be exposed to an outside of the female fastener component, and sealing said base portion of said female engaging device between said front material and said internal material;
        v. and wherein said female fastener component is substantially flush.

18. The method according to claim 17 further comprising the following steps:

b) preparing a male fastener component as follows:
   i. attaching a male engaging device to an internal material, wherein said male engaging device comprises a base portion and head portion,
   ii. attaching a back material to said internal material on an opposite surface from said male engaging device; and
   iii. attaching a front material to said internal material, wherein said front material has an opening or a slit allowing said head portion of said male engaging device to be exposed to an outside of said male fastener component, and sealing said base portion of said male engaging device between said internal material and said front material.

19. The fastener comprising a male means for engaging device and a female means for engaging device, wherein the male means for engaging device is embedded in a male fastener component and said female means for engaging device is embedded in a female fastener component,
   wherein said female fastener component comprises a back material, an internal material, and a front material, and wherein said female means for engaging device is attached to a surface of the internal material between the internal material and the front material of the female fastener component,
   wherein the female means for engaging device comprises a base portion and a head portion, and wherein said head portion of the female means for engaging device is located in a recess created by an opening in the front material wherein said head portion of the female means for engaging device is exposed to an outside of the female fastener component, and wherein said female fastener component is substantially flush,
   wherein the male fastener component comprises a back material, an internal material, and a front material, and said male means for engaging device is attached between the internal material and the front material of the male fastener component,
   wherein the male means for engaging device comprises a base portion and a head portion, and wherein said head portion of the male means for engaging device protrudes through an opening or slit provided in the front material exposing said head portion of the male means for engaging device to an outside of the male fastener component,
   wherein the head portions of the male and female means for engaging devices are engageable with each other and become substantially flush when engaged.

* * * * *